United States Patent
Sighinolfi

(10) Patent No.: US 6,359,447 B1
(45) Date of Patent: Mar. 19, 2002

(54) CONTROL UNIT FOR CHECKING THE INTEGRITY OF TEAR-OFF CLOSING DEVICES APPLIED TO RESPECTIVE OPENING IN STRIP PACKAGING MATERIAL FOR PRODUCING ASEPTIC SEALED PACKAGES OF POURABLE FOOD PRODUCTS

(75) Inventor: Eugenio Sighinolfi, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/543,103

(22) Filed: Apr. 4, 2000

(30) Foreign Application Priority Data

May 14, 1999 (EP) .............................. 99830300

(51) Int. Cl.$^7$ .......................... G01R 27/26; G01N 27/22
(52) U.S. Cl. ....................... 324/663; 324/558; 324/519; 53/64
(58) Field of Search ................................ 324/663, 558, 324/519; 53/55, 551, 64

(56) References Cited

U.S. PATENT DOCUMENTS

| 3,519,922 A | | 7/1970 | Nash et al. ..................... 324/61 |
| 3,663,239 A | * | 5/1972 | Rowe et al. .................... 99/171 |
| 4,620,145 A | * | 10/1986 | Dietz et al. ..................... 324/54 |
| 5,495,177 A | * | 2/1996 | Liang et al. .................. 324/663 |
| 5,966,897 A | | 10/1999 | Kirka et al. .................... 53/55 |
| 6,029,421 A | | 2/2000 | Mellbin et al. ................ 53/410 |
| 6,035,604 A | * | 3/2000 | Gustafsson ...................... 53/64 |
| 6,085,495 A | | 7/2000 | Fontanazzi et al. ............ 53/551 |

FOREIGN PATENT DOCUMENTS

DE    19705528 A1    8/1997

OTHER PUBLICATIONS

European Search Report dated Oct. 14, 1999.

* cited by examiner

Primary Examiner—Safet Metjahic
Assistant Examiner—Paresh Patel
(74) Attorney, Agent, or Firm—Burns, Doane, Swecker & Mathis, L.L.P.

(57) ABSTRACT

A control unit (1) interacting with a strip packaging material to which are applied, to close respective openings (3) in the packaging material, a number of patch elements (5) and a number of tear-off tongues (6) heat sealed to respective patch elements (5). To determine the integrity of the patch elements (5), the unit has at least one contact surface (21) at an operating electric potential (Va) and cooperating with the side of the packaging material (4) having the patch elements (5) to define one plate of a capacitor (23), the other plate of which is defined by an aluminium film (4a) of the packaging material (4), and the dielectric of which is defined by the heat-seal plastic material interposed between the plates; and a detecting circuit (26) connected to the contact surface (21) and to the aluminium film (4a) to detect an electric quantity related to variations in the dielectric strength of the dielectric of the capacitor (23) and so determine the presence of any microholes in the patch elements (5).

11 Claims, 3 Drawing Sheets

CONTROL UNIT FOR CHECKING THE INTEGRITY OF TEAR-OFF CLOSING DEVICES APPLIED TO RESPECTIVE OPENING IN STRIP PACKAGING MATERIAL FOR PRODUCING ASEPTIC SEALED PACKAGES OF POURABLE FOOD PRODUCTS

BACKGROUND OF THE INVENTION

1. Field of the Invention

The present invention relates to a control unit for checking the integrity of tear-off closing devices applied to respective openings in strip packaging material for producing aseptic sealed packages of pourable food products.

2. Background Information

As is known, many pourable food products, such as fruit juice, UHT (ultra-high-temperature treated) milk, wine, tomato sauce, etc., are sold in packages made of sterilized packaging material.

A typical example of such a package is the parallelepiped package for liquid or pourable food products known by the name of Tetra Brik Aseptic (registered trademark), which is formed by folding and sealing strip-rolled packaging material. The packaging material has a multilayer structure comprising a layer of fibrous material, e.g. paper, covered on both sides with layers of heat-seal plastic material, e.g. polyethylene. In the case of aseptic packages for long-storage products such as UHT milk, the packaging material comprises a layer of barrier material defined, for example, by an aluminium film, which is superimposed on a layer of heat-seal plastic material and is in turn covered with another layer of heat-seal plastic material defining the inner face of the package eventually contacting the food product.

As is known, such packages are produced on fully automatic packaging machines, on which a continuous tube is formed from the packaging material supplied in strip form. The strip of packaging material is sterilized on the packaging machine, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a tube.

The tube is filled with the sterilized or sterile-processed food product, and is sealed at equally spaced cross sections along which it is then cut into pillow packs, which are subsequently folded mechanically to form the finished, e.g. substantially parallelepiped, packages.

The finished package comprises an opening through which to pour the product; and a tear-off closing device applied to the opening.

The openings are formed and the respective closing devices applied to the strip packaging material before the material is folded into the vertical tube and filled with the food product.

More specifically, each closing device comprises a "patch" element defined by a small sheet of heat-seal plastic material and applied, so as to close the respective opening, to the side of the packaging material eventually defining the inside of the package; and a tear-off tongue applied to the opposite side of the packaging material and heat sealed to the patch element.

The tongue comprises a layer of aluminium; and a layer of heat-seal plastic material, normally polyethylene, which is sealed to the patch element. By virtue of the patch element and the tongue adhering to each other, the portion of the patch element sealed to the tongue is also removed, thus exposing the opening, when the tongue is torn off.

In the course of the heat-seal operation, tears or microholes may be formed in the superheated patch element, particularly as a result of the patch element interacting with the normally fairly irregular edges of the opening formed in the packaging material.

The presence of microholes in the patch element may impair the integrity and asepticity of the package by allowing outside air into the package.

SUMMARY OF THE INVENTION

It is an object of the present invention to provide a control unit for checking the integrity of tear-off closing devices applied to respective openings in strip packaging material, and which provides for quality controlling application of the closing devices to the packaging material. It is a further object of the present invention to enable said check to be made during operation of the packaging machine.

According to the present invention, there is provided a control unit for checking the integrity of tear-off closing devices applied to respective openings in a strip packaging material for forming aseptic sealed packages of pourable food products; said packaging material having a multilayer structure comprising at least one electrically conductive sheet of barrier material covered on opposite sides with respective layers of heat-seal plastic material; each said closing device comprising a sheet patch element made of heat-seal plastic material and applied, so as to close a respective said opening, to a face of said packaging material eventually defining the inside of the package, and a tear-off tongue also made of heat-seal plastic material and which is applied to an opposite face of said packaging material and sealed to said patch element; said unit being characterized by comprising:

at least one contact surface at an operating electric potential and cooperating with said packaging material at said patch elements to define one plate of a capacitor, the other plate of which is defined by said sheet of barrier material, and the dielectric of which is defined by the heat-seal plastic material of said patch elements and of the layer of packaging material interposed between said sheet of barrier material and the patch elements; and detecting means connected to said contact surface and to said sheet of barrier material of said packaging material to detect an electric quantity related to variations in the dielectric strength of the dielectric of said capacitor and so determine the presence of any microholes in said patch elements.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Number 1 in the accompanying drawings indicates a unit for checking the integrity of tear-off closing devices 2 applied to respective openings 3 in strip packaging material 4 fed along a path P.

Unit 1 may be incorporated in a packaging machine (not shown) for continuously producing, from strip packaging material 4, aseptic sealed packages (not shown) of pourable food products, such as pasteurized or UHT milk, fruit juice, wine etc. In particular, packaging material 4 is folded and sealed longitudinally in known manner to form a vertical tube, which is filled with the sterilized or sterile-processed food product, is sealed along equally spaced cross section, and is then folded mechanically to form the finished packages.

Unit 1 is located along path P of packaging material 4, downstream from a known station (not shown) for applying closing devices 2 to respective openings 3 in packaging material 4, and upstream from a station for forming the vertical tube of packaging material.

Packaging material 4 has a multilayer structure and substantially comprises a layer of fibrous material, e.g. paper, covered on both sides with respective layers of heat-seal plastic material, e.g. polyethylene. The side of packaging material 4 eventually defining the inner face of the package, and therefore contacting the food product, is also provided with a layer of electrically conductive barrier material defined, for example, by an aluminium film 4a, which in turn is covered on both sides with respective layers of heat-seal plastic material, e.g. polyethylene.

Figure 3:
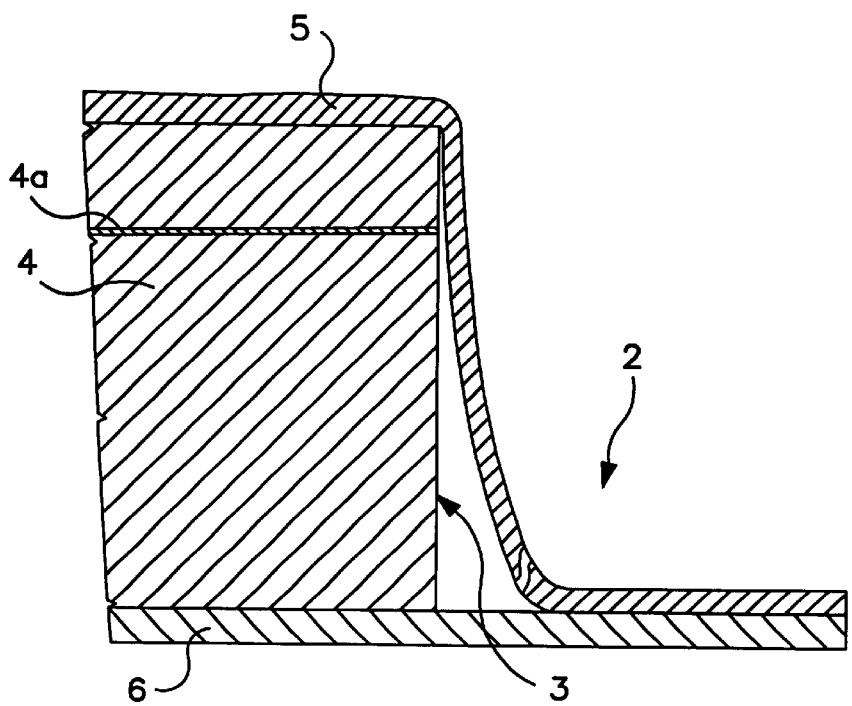
FIG. 3 shows a larger-scale section of a closing device applied to a respective opening in the packaging material.
Figure 4:
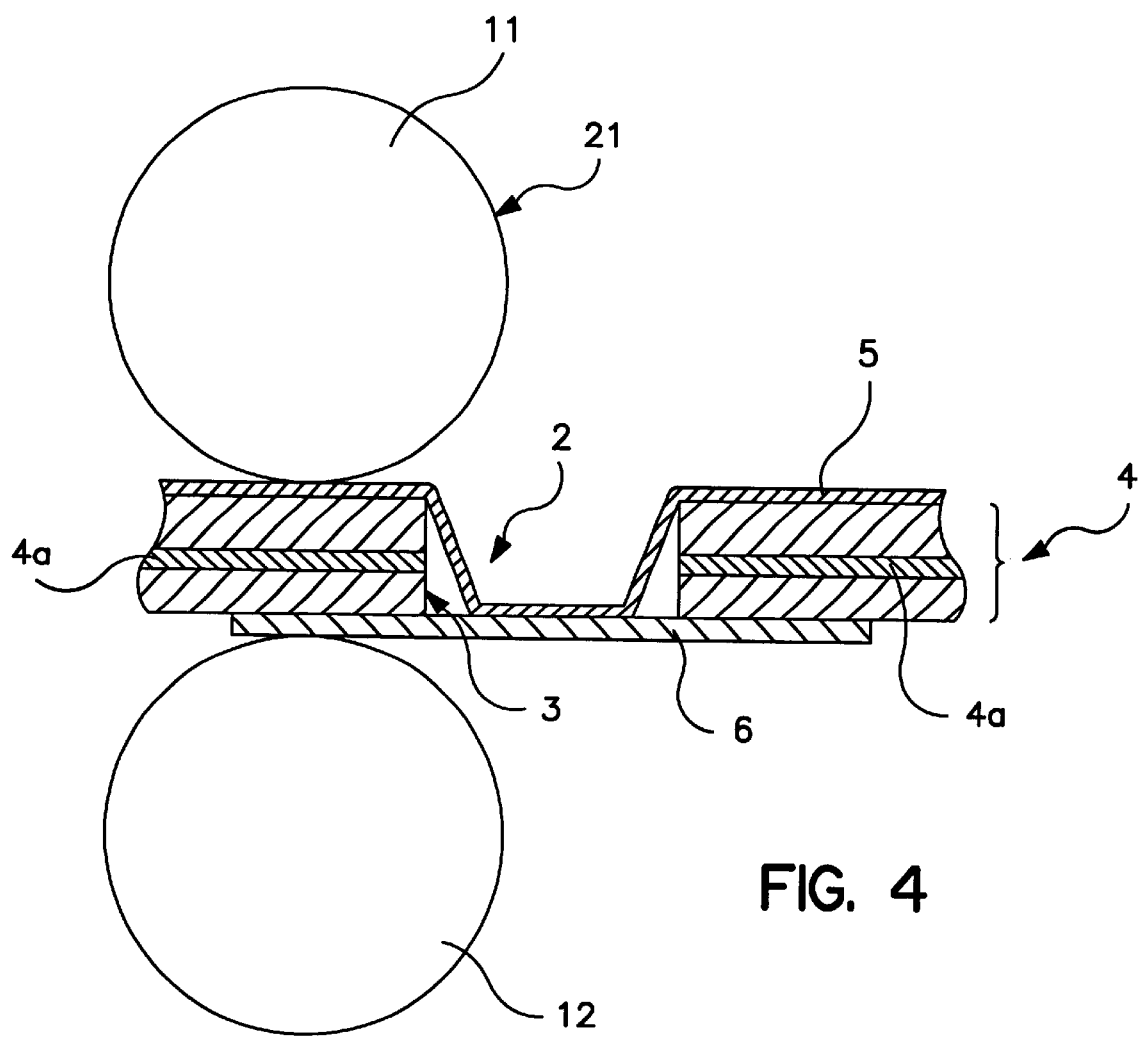
FIG. 4 illustrates a relationship between a) a section of packaging material with a sheet patch and a tongue closing

With particular reference to FIG. 3, each closing device 2 comprises a patch element 5 defined by a small sheet of heat-seal plastic material and applied, so as to close a respective opening 3, to the face of packaging material 4 eventually defining the inside of the package; and a tear-off tongue 6 which is also made of heat-seal plastic material, is applied to the opposite face of packaging material 4, and is heat-sealed to patch element 5. In particular, patch element 5 and tongue 6 are joined along a sealing area extending close to and inwards of a lateral edge of respective opening 3 and defining a tear portion of patch 5 when tongue 6 is torn off.

Figure 5:
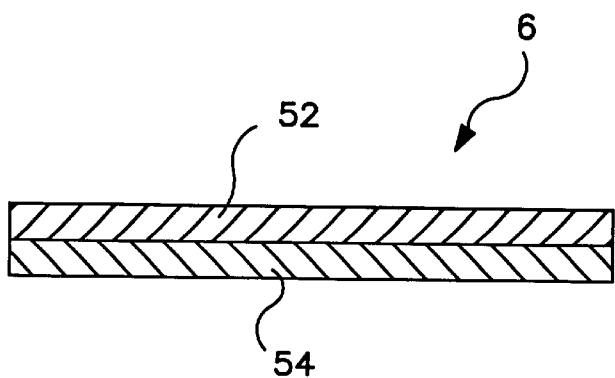
FIG. 5 illustrates a multilayer structure of a tongue.

Tongue 6 also has a multilayer structure as shown in FIG. 5, and comprises a layer 52 of heat-seal plastic material, e.g. polyethylene, one face of which is joined to patch element 5; and a layer 54 of barrier material, normally aluminium, which is fixed to the layer 52 of heat-seal plastic material on the opposite side to patch element 5.

Figure 1:
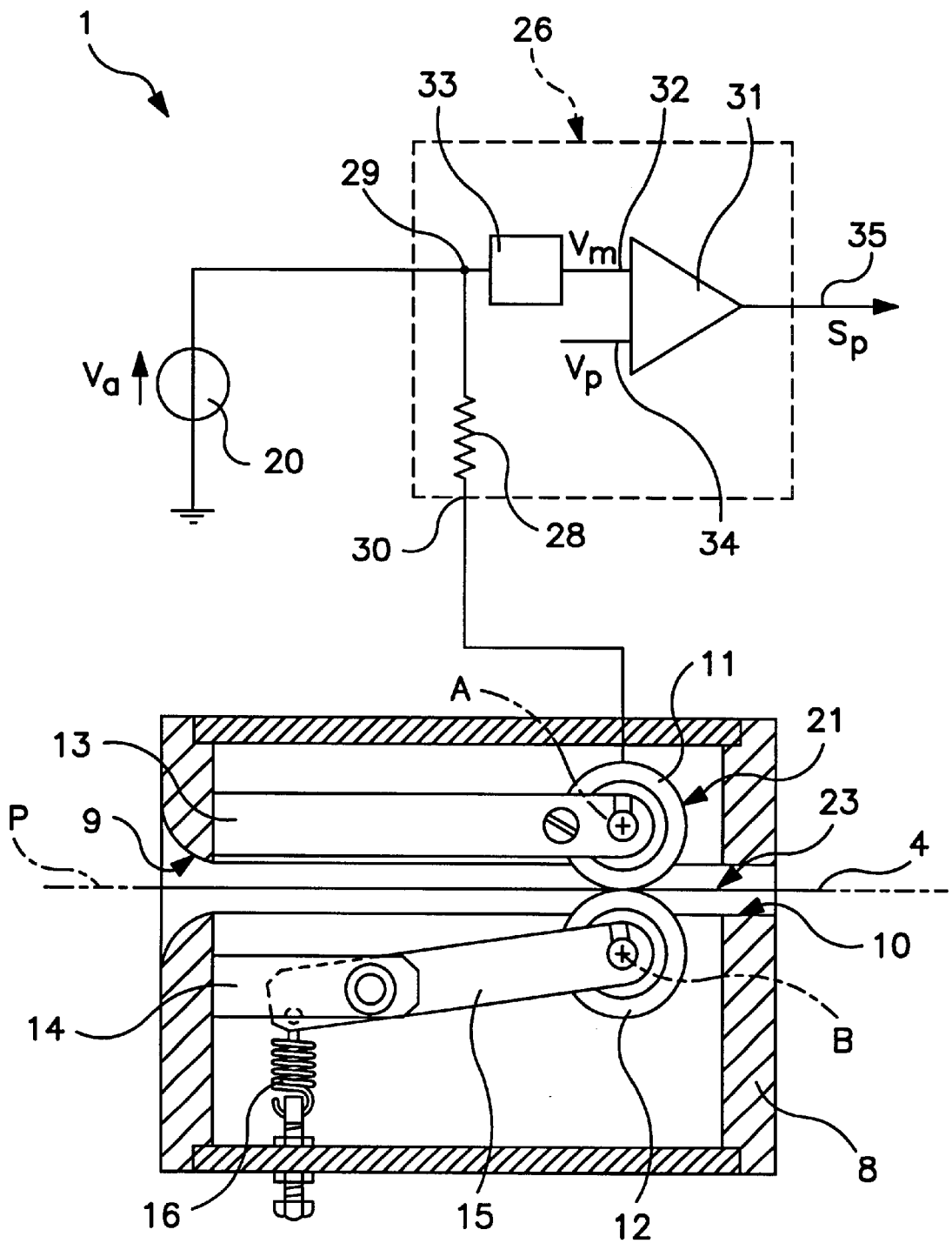
FIG. 1 shows a lateral elevation of a control unit in accordance with the present invention for checking the integrity of tear-off closing devices applied to respective openings in strip packaging material.
Figure 2:
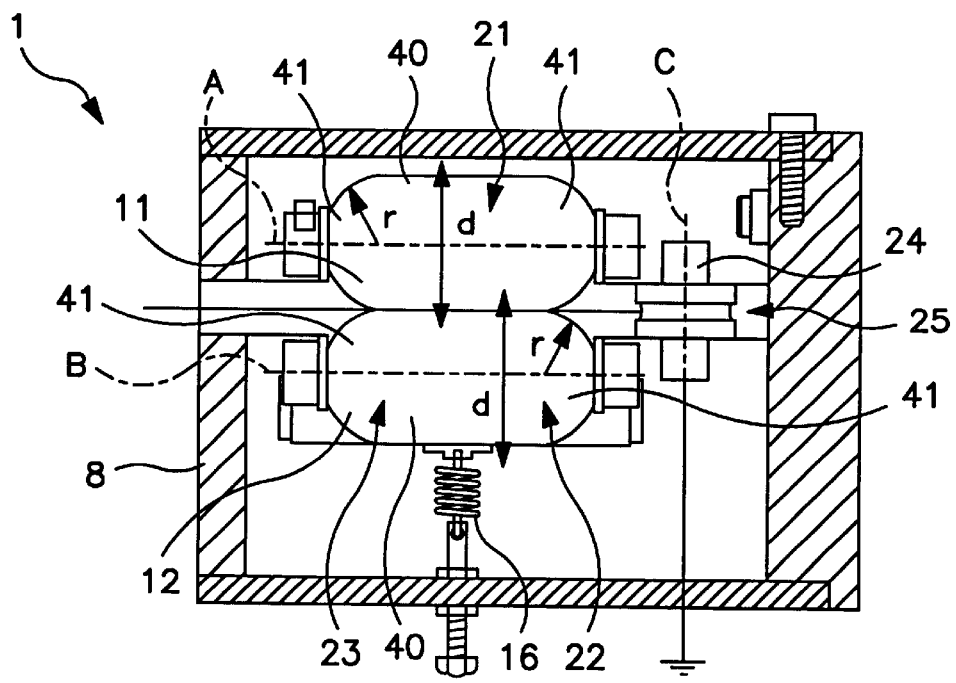
FIG. 2 shows a front elevation of the FIG. 1 control unit.

With reference to FIGS. 1 and 2, unit 1 substantially comprises an outer, substantially parallelepiped casing 8 made of plastic material and having opposite lateral openings 9, 10 for the passage of strip packaging material 4; and two idle rollers 11, 12, which are housed inside casing 8 with respective axes A, B parallel to packaging material 4, are supported in rotary manner by respective pairs of brackets 13, 14 projecting from a lateral wall of casing 8, and cooperate on opposite sides with packaging material 4 at patch elements 5 and tongues 6 respectively.

More specifically, roller 11 is fitted, in rotary manner about respective axis A, to the free ends of brackets 13, whereas roller 12 is fitted, in rotary manner about respective axis B, to one end of a rocker-arm lever 15 hinged at an intermediate point to brackets 14, and the opposite end of which is connected to the bottom wall of casing 8 by a cylindrical coil spring 16 which therefore exerts a turning moment on lever 15 to keep roller 12 in contact with packaging material 4.

Each roller 11, 12 comprises a cylindrical intermediate portion 40 of diameter d; and rounded, outwardly-convex opposite end portions 41 with a radius of curvature r ranging between 0.25 and 0.5 times the diameter d of intermediate portion 40.

Roller 11 is connected to an adjustable high-voltage generator 20, so that an outer surface 21 of roller 11 contacting packaging material 4 is at an operating potential Va, whereas aluminium film 4a of packaging material 4 is at ground potential. Surface 21 of roller 11 and aluminium film 4a of packaging material 4 define respective plates of a capacitor 23, the dielectric of which is defined by the heat-seal plastic material of patch elements 5 and of the layer of packaging material 4 interposed between aluminium film 4a and patch elements 5.

To ensure safe grounding of aluminium film 4a of packaging material 4, there is provided a further idle roller 24 which is housed inside casing 8 so as to rotate about a respective axis C perpendicular to packaging material 4, has an outer annular groove 25 cooperating with and laterally contacting a peripheral edge of packaging material 4, and is grounded.

An important aspect of the present invention is that unit 1 also comprises a detecting circuit 26 for detecting variations in the dielectric strength of packaging material 4 fitted with closing devices 2, and so determining the presence of any microholes (FIG. 3) in patch elements 5.

More specifically, on account of the different insulating properties of air and the material defining patch elements 5, tests have shown that, when closing devices 2 are perfectly integral, the dielectric strength of packaging material 4 fitted with closing devices 2 equals a first value D1—in the example shown, 20 kV/mm—and assumes a second value D2—in the example shown, 3 kV—lower than value D1 in the presence of microholes in patch element 5.

Detecting circuit 26 provides for detecting electric current flow through the dielectric of capacitor 23, which occurs as a function of the operating potential value Va supplied by generator 20 and when the dielectric strength of packaging material 4 fitted with closing devices 2 passes from value D1 to value D2, i.e. in the presence of microholes in patch element 5. In particular, the operating potential Va supplied by generator 20 is so selected as to produce no electric current flow through the dielectric of capacitor 23 when patch elements 5 are perfectly integral, but to be sufficient to produce such current flow in the presence of microholes in patch elements 5.

With particular reference to FIG. 1, detecting circuit 26 comprises a resistor 28 having a first terminal 29 connected to generator 20, and a second terminal 30 connected to roller 11; and a comparator 31 having a first input 32 connected to terminal 29 via the interposition of a voltage reducer 33 supplying a measuring potential Vm related to the potential of terminal 29 and therefore to operating potential Va, a second input 34 receiving a reference potential Vf, and an output 35 supplying a logic state signal Sp indicating the presence/absence of microholes in relative patch element 5, and which assumes a high logic level (Sp=1) when measuring potential Vm is below reference potential Vf, and a low logic level (Sp=0) in other conditions.

In actual use, generator 20 supplies a square-wave operating potential Va, which assumes high values in the neighborhood of each closing device 2, and low values at the areas of packaging material 4 interposed between two successive openings 3, so as to produce, at such areas, no flow of electric current possibly caused by the presence of small cracks in the layers of heat-seal plastic material contacting the aluminium layer, and which may impair packaging material 4.

In the event of a microhole (FIG. 3) in the patch element 5 traveling between rollers 11 and 12, the dielectric strength of the material interposed between roller 11 and aluminium film 4a of packaging material 4 falls from value D1 to value D2, so that, in the presence of a high operating potential Va value from generator 20, current flows through packaging material 4 thus resulting in a fall in measuring potential Vm. As measuring potential Vm falls below reference potential Vf, state signal Sp switches from a low to a high logic level to indicate the presence of a microhole in patch element 5.

When measuring potential Vm falls below a minimum threshold value related to the dielectric strength D2 of the material interposed between roller 11 and aluminium film 4a of packaging material 4, no electric current flows through packaging material 4, so that potential Vm increases up to a maximum threshold value above which electric current again flows through the dielectric of capacitor 23; which phenomenon is repeated until the microhole gets past rollers 11 and 12, i.e. for a time interval depending on the traveling speed of packaging material 4.

When the microhole gets past rollers 11 and 12, measuring potential Vm returns to the nominal value and, hence, state signal SP assumes a low logic level.

Conversely, if the patch element 5 traveling between rollers 11 and 12 is perfectly integral, no electric current flows through packaging material 4 fitted with closing devices 2, so that measuring potential Vm remains at the nominal value and does not fall below reference potential Vf, and signal Sp remains at the low logic level (Sp=0).

The advantage of unit 1 according to the present invention will be clear from the foregoing description.

In particular, unit 1 provides for quality controlling the operations performed on packaging material 4 to form openings 3 and apply respective closing devices 2. The information contained in state signal Sp indicating the presence of microholes in patch elements 5 may be used to reject, at a subsequent stage in the operating cycle of the packaging machine, at least the packages formed from the portion of packaging material 4 comprising defective patch elements 5.

Clearly, changes may be made to unit 1 as described and illustrated herein without, however, departing from the scope of the accompanying Claims.

In particular, roller 11 connected to generator 20 may be connected to casing 8 by rocker-arm lever 15 and spring 16, and roller 12 may be fitted in a fixed position to casing 8.

What is claimed is:

1. A control unit for checking the integrity of tear-off closing devices applied to openings in a packaging material strip for forming aseptic packages of pourable food products, wherein the packaging material strip has a first face for defining an inside of a package, a second face opposite the first face, and a multi-layer structure comprising at least one electrically conductive sheet of barrier material disposed between layers of heat-seal plastic material, and wherein the tear-off closing devices each comprise a sheet patch element made of heat-seal plastic material and applied to the first face of the packaging material strip to cover a respective one of the openings, and a tear-off tongue made of heat-seal plastic material and applied to the second face of the packaging material strip and sealed to the sheet patch element through the respective one of the openings, the control unit comprising:

first and second idle rollers a) having parallel rotational axes and b) arranged to cooperate respectively with the first and second faces of the packaging material strip at the patch elements and the tongues, the first idle roller having an electrically conductive outer surface;

a third idle roller a) having an electrically conductive outer surface connected to ground potential and b) having a rotational axis perpendicular to the rotational axes of the first and second idle rollers and c) arranged to contact the at least one electrically conductive sheet of barrier material at a peripheral edge of the packaging material strip; and a detecting circuit connected between an operating electric potential and the electrically conductive outer surface of the first idle roller, to detect an electric current flow between the first and third idle rollers, the detecting circuit being arranged to a) detect an absence or presence of at least one microhole in one of the patch elements when a portion of the packaging material strip including the one of the patch elements is between the first and second idle rollers, based on the detected electric current flow between the first and third rollers, and b) output a signal indicating the detected absence or presence of at least one microhole in the one of the patch elements.

2. A system comprising:

a packaging material strip for forming aseptic packages of pourable food products and provided with openings and tear-off closing devices applied to the openings; and a control unit for checking the integrity of the tear-off closing devices;

wherein the packaging material strip has a first face for defining an inside of a package, a second face opposite the first face, and a multi-layer structure comprising at least one electrically conductive sheet of barrier material disposed between layers of heat-seal plastic material;

wherein the tear-off closing devices each comprise a sheet patch element made of heat-seal plastic material and applied to the first face of the packaging material strip to cover a respective one of the openings, and a tear-off tongue made of heat-seal plastic material and applied to the second face of the packaging material strip and sealed to the sheet patch element through the respective one of the openings;

wherein the control unit comprises a) at least one contact surface at a first operating electric potential, the at least one contact surface cooperating with the sheet patch element applied to the packaging material strip to define a first plate of a capacitor, the at least one electrically conductive sheet of barrier material defining a second plate of the capacitor, the heat-seal material of the patch element and the heat-seal material of the packaging material strip interposed between the electrically conductive sheet of barrier material and the sheet patch element forming a dielectric of the capacitor, b) a mechanism arranged to connect the electrically conductive sheet of barrier material to a second operating electric potential, and c) detecting means connected to the at least one contact surface and the electrically conductive sheet of barrier material for detecting holes in the sheet patch element of at least one of the tear-off closing devices.

3. The system of claim 2, wherein the detecting means comprise indicating means for indicating electric current flow through the dielectric of the capacitor.

4. The system of claim 2, wherein the detecting means comprise comparing means having a first input receiving a reference signal indicating a reference potential, a second input receiving a measuring signal indicating a measuring potential related to the first operating electric potential, and an output supplying a state signal indicating the presence of microholes in a relative the patch element in the event of a predetermined relationship between the measuring signal and the reference signal.

5. The system of claim 4, wherein the state signal is a logic signal assuming a first logic level indicating the presence of microholes in the relative the patch element when the measuring potential is less than the reference potential.

6. The system of claim 2, wherein the at least one contact surface is connected to voltage-generating means supplying the first operating electric potential; and the detecting means comprises resisting means interposed between the voltage-generating means and the at least one contact surface.

7. The system of claim 2, the control unit comprising a first and a second idle roller, which have respective axes parallel to the packaging material, and which cooperate respectively with opposite sides of the packaging material at the patch element and the tongue respectively; the at least one contact surface being defined by the outer surface of the first idle roller.

8. The system of claim 7, wherein the first and second idle rollers each comprise a cylindrical intermediate portion; and rounded, outwardly-convex opposite end portions having a radius of curvature ranging between 0.25 and 0.5 times the diameter of the intermediate portion.

9. The system of claim 2, wherein the tongue has a multilayer structure comprising a layer of barrier material.

10. The system of claim 2, comprising a third idle roller which has an axis perpendicular to the packaging material, cooperates laterally with a peripheral edge of the packaging material, and is at the second operating potential.

11. The system of claim 10, wherein the second operating potential is at ground potential.

* * * * *